United States Patent [19]
Kropp

[11] 3,717,410
[45] Feb. 20, 1973

[54] PHOTOMICROGRAPHIC APPARATUS

[75] Inventor: Karl Kropp, Vienna, Austria

[73] Assignee: C. Reichert Optische Werke A.G., Vienna, Austria

[22] Filed: Jan. 26, 1972

[21] Appl. No.: 220,918

[52] U.S. Cl..................................................355/46
[51] Int. Cl.............................................G03b 27/44
[58] Field of Search...........................95/18; 355/46

[56] References Cited

UNITED STATES PATENTS 3,563,637  2/1971  Ferguson..........................355/46 X

*Primary Examiner*—Samuel S. Matthews
*Assistant Examiner*—Michael Harris
*Attorney*—William C. Nealon et al.

[57] ABSTRACT

A number of camera backs are accommodated on a single photomicrographic apparatus. A mirror which deflects the microscope optical path selectively into each camera is rotatable by a control drive to an operative position relative to each camera.

3 Claims, 1 Drawing Figure

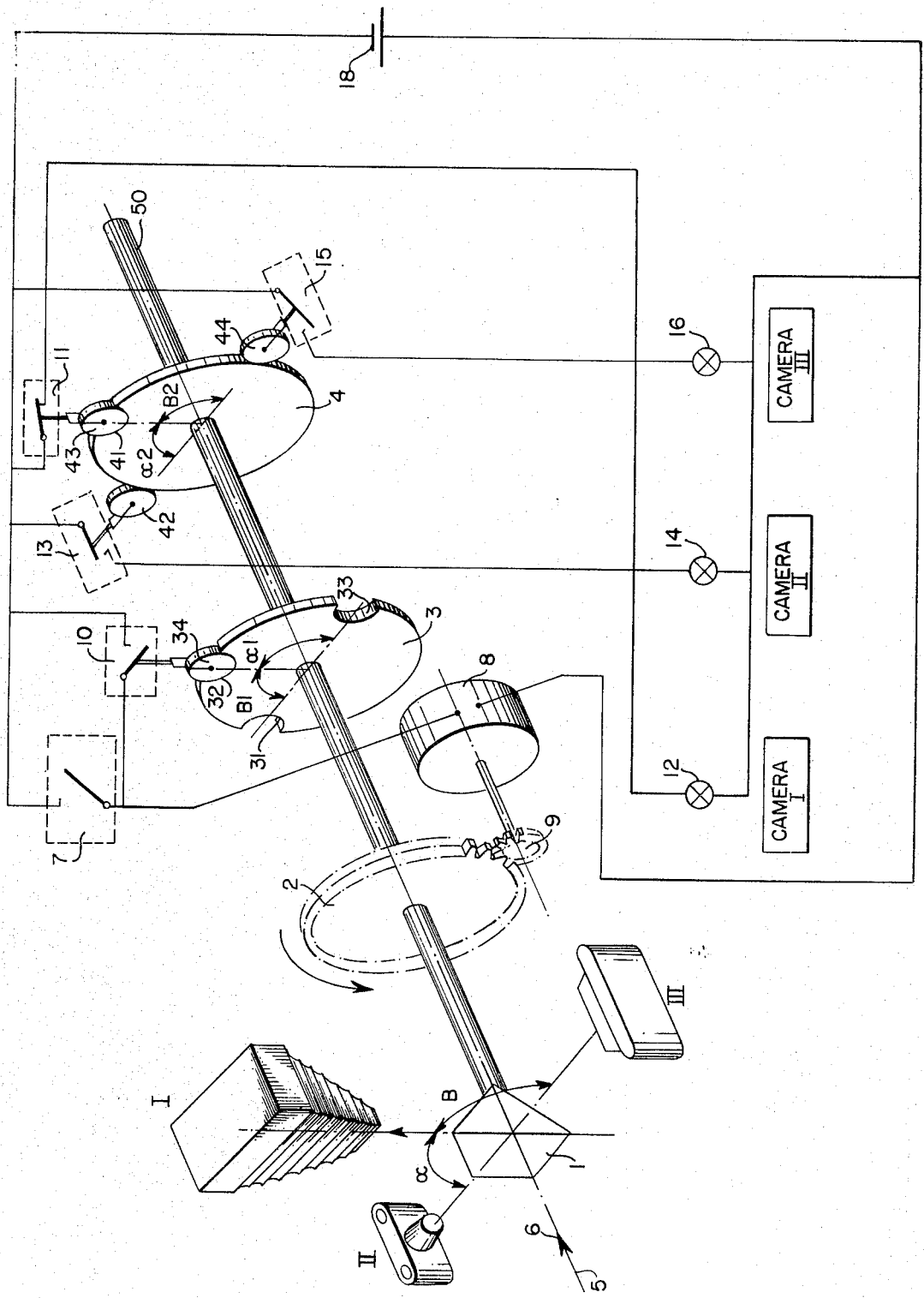

3,717,410

PHOTOMICROGRAPHIC APPARATUS

BACKGROUND OF THE INVENTION

This invention relates to photomicrographic apparatus in general and more particularly to apparatus to accommodate and selectively operate a plurality of different sized camera backs which are mounted relative to a microscope optical path.

With the multiplicity of available microscope techniques, and the corresponding variety of data obtained by these techniques, no single camera can resolve or record this data photomicrographically with optimum results. For example, a Polaroid camera is generally used where results are desired immediately. A miniature camera is often used for routine investigations. A plate or view camera is generally used where the data places the highest demand on the photographic equipment, such as when enlarged reproductions are required. In view of these various conditions and purposes, it is desirable that the several appropriate cameras be made operative with respect to the microscope by quick and simple manipulation.

SUMMARY OF THE INVENTION

Accordingly, it is an object of this invention to provide a photomicroscope with provision for the simple and rapid selective shifting of the optical path to one of several cameras.

Another object is to provide such a photomicroscope with provision for indicating which, among the several cameras, is in operative relationship with the microscope.

Further objects, advantages, and features of this invention may become apparent from the following description of one embodiment thereof, taken in connection with the accompanying drawing.

Briefly, this invention is practiced in one form by a photomicroscope including a plurality of cameras directed at the microscope optical path. A reflecting element in the optical path is motor-controlled so as to selectively deflect the microscope optical path toward one or another of the cameras. An indicator apparatus is operatively coupled with the reflecting element to indicate the operative position thereof so as in turn to indicate which of the cameras is operative with respect to the microscope. The indicator is preferably a cam disk on a rotatable axis to which the reflecting element is mounted. When the reflecting element connects the microscope optical path with a given camera optical path, a cam follower closes a switch to light an indicator light.

DRAWING

The drawing is an electrical and mechanical schematic showing the control system of this invention relative to three cameras and the microscope optical path.

DESCRIPTION

With reference now to the drawing, a light beam reflecting prism 1 is shown disposed along an axis 5 which forms part of the optical path of a microscope. Reflecting prism 1 is mounted on a shaft 50 which is coaxial with axis 5 and on which are also mounted a drive gear 2 and a pair of control disks 3 and 4. Drive gear 2 is in operative engagement with a driving pinion 9 which is driven by an electric motor 8.

Disks 3 and 4 are cam disks and define recesses for the accommodation of cam followers. Recesses 31, 32, and 33 in disk 3 accommodate a cam follower 34 which is operatively connected to an electric switch 10. Recess 41 on disk 4 accommodates cam followers 42, 43, and 44 which are operatively connected respectively with electric switches 13, 11, and 15. Switches 11, 13, and 15, are associated respectively with indicator lights 12, 14, and 16 in a circuit which includes a source of electrical energy 18. This electric circuit also includes the drive motor 8 and a manual switch 7 connected in parallel with the cam operated switch 10.

A plurality of cameras are disposed with their optical axes directed at axis 5, the optical path of a microscope. These cameras may be of any number and variety, subject only to space limitations, and are represented only for purposes of illustration as three cameras I, II, and III.

In the position shown, light coming from the microscope optics along axis 5 and in the direction of arrow 6 is reflected by the prism 1 to camera I. Also in this position, control disk 3 is oriented so that follower 34 lies in the recess 32 so that the switch 10 is open and the control disk 4 is oriented so that follower 43 lies in the recess 41 so that the switch 11 is closed. In this condition, with camera I operatively disposed relative to the microscope optical axis 5, and switch 11 is closed, the indicator light 12 is turned on to indicate that prism 1 is in the "camera I" position. (Lights 12, 14, 16 are suitably identified, as by panel labels, to indicate their relationship to cameras I, II, and III respectively).

In order to change to another camera, manual switch 7 is momentarily closed energizing the motor 8 to drive the gear 2 and shaft 50 in the counter-clockwise direction indicated. As soon as rotation of gear 2 and disks 3 and 4 is begun, follower 34 rises out of the recess 32 to close switch 10 whereby the drive motor 8 is energized independently of manual switch 7 until the follower 34 drops into the next recess 33. Also, when rotation is started, follower 43 rises from recess 41 and opens switch 11 to turn off the indicator light 12. When the prism 1, disk 3 and disk 4 have rotated counter-clockwise through an angle $\alpha$, prism 1 is in a position to deflect light from axis 5 to camera II. At the same point, follower 34 is within recess 33 so that the switch 10 and motor 8 are disconnected, and follower 42 is within recess 41 so that switch 13 is closed and indicator light 14 is on, showing that the prism 1 is in the "camera II" position. Similarly, when the manual switch 7 is again closed, the system is again rotated until the recess 31 causes the motor to stop and follower 44 causes the indicator light 15 to show that the prism is in the "camera III" position.

It will be apparent that the angular displacements between the various camera axes is related to the angular displacements between the recesses on disk 3 and between the cam followers associated with disk 4. Specifically, $\alpha = \alpha 1 = \alpha 2$ and $\beta = \beta 1 = \beta 2$.

By means of the foregoing described apparatus, a plurality of cameras of various parameters can be conveniently associated with a microscope for microphotography. By the simple controlled and indicated revolution of a reflector, the various cameras are selectively put into operative engagement with the microscope optical system.

The foregoing description of an embodiment of this invention is given by way of illustration and not of limitation. The concept and scope of the invention are limited only by the following claims and equivalents thereof which may occur to others skilled in the art.

What is claimed is:

1. A photomicrographic apparatus including a plurality of cameras directed along their respective axes at a common point on an optical path and characterized by the following improvement:
    a reflector disposed in said optical path to at said common point and rotatable relative to said optical path to selectively deflect and direct said optical path along the axis of any one of said cameras, and
    indicia to signal the occurrence of alignment of said optical path with the axis of one of said cameras, said indicia being operatively connected to indicia actuation means rotatable with said reflector.

2. A photomicrographic apparatus as described in claim 1 further including a drive motor to rotate said reflector, said drive motor operatively connected to a control switch which is held in a closed position, by means rotatable with said reflector, at all angular positions of said reflector other than those positions thereof at which said optical path is aligned with the axis of one of said cameras.

3. Apparatus for the selective direction of an optical path to any of a plurality of cameras including:
    a reflector disposed in said optical path and being rotatable about the axis thereof,
    means operatively connected to said mirror to indicate an occurrence of alignment of said optical path with one of said cameras, and
    means to rotate said reflector between positions of such alignment and to stop rotation at occurrences thereof.

* * * * *